(12) United States Patent
Shi et al.

(10) Patent No.: US 6,305,178 B1
(45) Date of Patent: Oct. 23, 2001

(54) CONTINUOUS SYSTEM OF FREEZE CONCENTRATION FOR AQUEOUS SOLUTIONS

(76) Inventors: Yuping Shi; Baomin Liang, both of 466 Hilltop Dr., Madison, WI (US) 53711-1250

(*) Notice: Subject to any disclaimer, the term of this patent is extended or adjusted under 35 U.S.C. 154(b) by 0 days.

(21) Appl. No.: 09/552,810

(22) Filed: Apr. 20, 2000

Related U.S. Application Data

(60) Provisional application No. 60/132,736, filed on May 6, 1999.

(51) Int. Cl.$^7$ .................................................. B01D 9/04
(52) U.S. Cl. ........................................... 62/123; 62/532
(58) Field of Search ................................ 62/123, 532

(56) References Cited

U.S. PATENT DOCUMENTS

| | | | |
|---|---|---|---|
| 3,817,051 | * 6/1974 | Seliber | 62/123 |
| 3,885,399 | * 5/1975 | Campbell | 62/123 |
| 4,735,641 | * 4/1988 | Engdahl | 62/532 |
| 4,936,114 | * 6/1990 | Engdahl et al. | 62/532 |
| 5,400,619 | * 3/1995 | Husseiny et al. | 62/532 |

* cited by examiner

*Primary Examiner*—Ronald Capossela

(57) ABSTRACT

Investigations on the formation and growth behavior of ice crystallization in aqueous solutions reveal an important phenomenon—ice crystal transformation. It leads to very rapid growth of ice crystals and result in grain-shaped and agglomerated large crystals without inside entrainment of solute. This provides a practical basis for a new technology of freeze concentration. The efficient physical process for freeze concentration of aqueous solutions comprises, mainly, refrigerating solutions to a supercooled status without ice nucleation, or without ice formation on the heat transfer surface, instantaneously nucleating the supercooled solution to generate fine ice crystals and make the solution concentrated, producing large, grain/sphere-shaped ice crystals at high rate by growth, transformation and agglomeration of ice crystals under environment of well-controlled endo/exothermal balances. Apparatus for performing the process including, mainly, refrigerating heat exchangers, nucleators, filters and multi-function crystallizers are described. Single-stage and multistage operations can be used for the process and the major steps can be flexibly arranged.

24 Claims, 7 Drawing Sheets

CONTINUOUS SYSTEM OF FREEZE CONCENTRATION FOR AQUEOUS SOLUTIONS

This application claims the benefit of Provisional Application No. 60/132,736, filed May 6, 1999.

FIELD OF THE INVENTION

The present invention relates to a physical process for the freeze concentration of various aqueous solutions, more particularly aqueous solutions in food, beverage, dairy, pharmaceutical, nutriceutical, biochemical and environmental industries. The invention also relates to the apparatus for performing the method.

BACKGROUND OF THE INVENTION

Concentration of aqueous solutions is a common process in many industries. The technique widely used for the concentration of aqueous solutions is evaporation. However, an efficient evaporation process must be performed under boiling conditions at higher temperatures, which may result in loss and/or damage of certain volatile or heat-sensitive materials in the solutions. Instead of turning water into steam, freeze concentration is a process by crystallizing water into ice at temperatures below freezing point of the solutions, hence, making aqueous solutions concentrated. Purposes of freeze concentration may be obtaining concentrated solutions, purified water or both. Freeze concentration has many advantages over evaporation because of the lower process temperature. At a lower temperature flavors, aromas, nutrients and other valuable components in the original materials can be kept without loss. At a lower temperature, destruction of heat-sensitive substances can be avoided. Therefore, with freeze concentration extremely high quality products can be obtained. In addition, at a lower temperature any escape of volatile hazards from treated solutions or waste waters can be averted. For these reasons, freeze concentration is very attractive to food, beverage, dairy, biochemical, nutriceutical, pharmaceutical, chemical, and environmental industries. Although the total dewatering cost by freeze concentration have until now been higher than that by evaporation, its application has spread in areas where the high quality product is more important or the low temperature of process is necessary.

Theoretically, the latent heat of phase transition from water to ice (about 76 kcal/kg) is only one seventh of that from water to steam (about 540 kcal/kg). It means there is a great potential to save a lot of energy by use of freeze concentration of aqueous solutions. Potential commercial applications in many industries and economy of energy have been an attractive target for scientists and engineers. Efforts have been made for decades to use freeze concentration commercially. Freeze concentration contains, usually, steps of refrigeration of solution, crystallization of ice and separation of ice crystals from the mother liquid. To make a freeze concentration technique commercially feasible, aqueous solutions must be efficiently and economically refrigerated and large, uniform ice crystals, which are easily separated from the solution, must be efficiently obtained. However, ice crystallization is a complex phase transition and control of ice crystallization is very difficult due to the complexity. According to the generally accepted concept that the nucleation rate is proportional to the supercooling square while as growth rate is only linear to the supercooling, supercooling level must be increased in order to promote the efficiency, but this will cause higher nucleation rate resulting in plenty of small ice crystals. In contrast, efficiency will be decreased as lower supercooling level (e.g. <0.4° C.) is used to obtain large and sphere-like ice crystals (Shimoyamada, M. et al., 1997, Nippon Shokuhin Kagaku Kogaku Kaishi, 44(1), 59–61). Therefore, the major difficulties for freeze concentration are in two interrelated aspects. Firstly, it is hard to separate ice crystals from the concentrated solution because of small size of ice crystals obtained. Secondly, process of obtaining large ice crystals proceeds slowly and the efficiency is low.

Since 1970s, a freeze concentration process has been developed and further improved at Grenco Process Technology, B.V., The Netherlands and later Niro Process Technology, B.V., The Netherlands. The technology includes a scraped surface heat exchanger to freeze an aqueous solution and to generate fine ice crystals, a recrystallizer for ripening to form large ice crystals and a wash column to wash and separate ice crystals from the solution. The ripening crystallization (ice crystal growth) and the concentration of solution in the process are performed in multiple stages. Ice crystals are transferred from one stage to another. As claimed, multistage operation is beneficial to higher efficiency. These technologies are described in U.S. Pat. Nos. 4,332,140 to Thijssen et al., U.S. Pat. No. 4,332,599 to Thijssen et al., U.S. Pat. No. 4,338,109 to Thijssen et al., U.S. Pat. No. 4,459,144 to Van Pelt et al. and U.S. Pat. No. 4,557,741 to Van Pelt et al. They are now commercially used in certain areas (ice beer, juice, waste water, etc.). However, in addition to the higher cost for coolant/refrigerant, there are other problems with this existing freeze concentration process that limit its application due to higher costs. These problems include mainly: 1) high energy consumption for ice-scraping in the freezer to obtain sufficient ice nuclei, 2) slow crystal growth by means of ripening in the recrystallizer to produce large ice crystals for efficient separation. The high capital cost of scraped surface heat exchanger also limits the utilization of this freeze concentration process in areas such as food industry.

Ripening is a phenomenon that under certain conditions small ice crystals will melt and large ice crystals will grow when they are co-existing in an aqueous solution. This phenomenon has been discovered for a long time and can be explained by the classical thermodynamic theory based on the relations among surface energy, heat of crystallization and crystal size. The effect of the diameter of spherical isotropic crystals on the lowering of the equilibrium temperature can be interpreted by the Gibbs-Thomson equation. The lowering of the equilibrium temperature of a small crystal in a solution is proportional to the surface energy and the equilibrium temperature of that same solution for a very large crystal, but inversely proportional to its diameter, the density of the crystal and the heat of crystallization. According to this theory, compared to larger ice crystals, smaller ice crystals need higher supercooling level to survive. Therefore, at a certain bulk temperature smaller ice crystals might be melted and larger ice crystals would grow when they are co-existing. However, this transformation process can only occur, generally, in a certain range of small size of ice crystal, within ten micrometers (van der Malen, B. G. M. and van Pelt, W. H. J. M., 1983, in 'Progress in Food Engineering—Solid Extraction, Isolation, Purification and Texturization', C. Cantarelli and C. Peri (eds.), Foster-Varley, Switzlands, 413–434; Thijssen, H. A. C., 1974, in 'Advances in Preconcentration and Dehydration of Foods', Arnold Spicer (ed.), Applied Science Publishers Ltd., London, 115–149). In this size range, the transformation process can proceed very rapidly, even in a moment. But in the larger size range (e.g. larger than 100 micrometers), as happens in the ripening process of the existing freeze concentration technology, it was showed from the previous investigators that the rate of crystal growth was quite limited. In several hours, ice crystal size can reach a mean of only 0.3–0.4 mm (Smith, C. E. and Schwartzberg, H. G., 1985, Biotechnology progress, 1(2), 111–120). And the higher the concentration of solution in the ripening tank, the lower the growth rate of ice crystals. That is why the results were not ideal as efforts were made to apply this theory to the freeze concentration process. Usually, only lower driving force (0.01–0.05° C.) can be used to realize smooth but slow ripening to avoid generation of new fine crystals.

To make ripening process be in progress smoothly, co-existence of small and large ice crystals is necessary under certain conditions. In the existing freeze concentration process, fine ice crystals (nuclei) are generated in a scraped surface heat exchanger by freezing aqueous solutions and scraping the ice layer formed on the heat exchange surface. The work is very energy-consumptive. The energy used for the scraping work and for the refrigeration to remove heat due to friction was estimated to account for two thirds of the total energy consumption (Schwartzberg, H. G., 1988, Potential improvements in food freeze concentration, Presentation at Session 73, AIChE National Meeting, Denver, Colo., August 21–24).

On the basis of scraped surface freezing exchanger and ripening crystallizer of Grenco/Niro process, techniques of freeze concentration were developed on different specific aqueous solutions such as dairy liquids (e.g. U.S. Pat. No. 4,959,234 to Ahmed et al.), coffee extracts (e.g. U.S. Pat. No. 5,736,182 to Jimenez et al.), waste waters (e.g. U.S. Pat. No. 5,443,733 to Mueller et al. and U.S. Pat. No. 5,558,778 to Janssen et al.), etc. In addition to the Grenco/Niro process, other techniques of freeze concentration were also developed. U.S. Pat. No. 4,666,484 to Shah et al. describes a multistage freeze concentrating process that uses screw concentrators and falling film freeze exchangers. Ice crystals are formed in the freeze exchangers and thick orange juices are obtained by use of this technique. The ice crystals are fine and with loose structure due to no further procedure for growth and perfection of the formed crystals to follow. Entrainment of solution in the fine ice crystals brings difficulty to recover the solute. More water is needed to wash the ice crystals so that it increases the load on the freeze exchangers, hence, the energy consumption. The suitability of freeze exchanger to only certain solutions also limits the application of this technique. Ghodsizadeh et al. developed a freeze concentration system and method (U.S. Pat. No. 4,830,645 or European Pat. No. 0360876) different from the Grenco/Niro process mainly in the recrystallization step. Gradient columns are used for growth of ice crystal, separation of ice crystals from the heavy liquor. In the gradient columns a porous bed of agglomerated ice crystals is formed and rising. Ice crystals are removed from the top of ice bed by scraping or cutting devices, with which additional energy is needed. The gradient columns have relatively complex structures and higher capital costs. In 1997, Shirai et al. (Japan Pat. No. 09299704) presented a technique of freeze concentration consisting of three crystallizers and a washing column. Initial ice crystals are obtained by freezing pure water and introduced as seeds into the third crystallizer, where the aqueous solution with higher concentration is present. The original aqueous solution to be concentrated is transported into the first crystallizer. Ice crystals and solutions are transferred from one crystallizer to another in a counter-current manner. Unlike the Grenco/Niro process, the growth of ice crystals and the concentration of solution rely on the jacket cooling of the crystallizers. In addition, heating is applied at the top of the washing column, which is similar to that in Grenco/Niro process, to melt small ice crystals and to promote the growth of large ice crystals in the column. Extra energy consumption for heating the slurry in the column, lower driving force for the ice crystal growth in the crystallizers and limitation of the cooling capacity of the crystallizers are drawbacks of this technology. All the above-mentioned techniques, except the Grenco/Niro process, have not been commercialized due to problems of one kind or another as above-analyzed.

Based on our experimental observations and research findings combined with the fundamentals on ice crystallization, we summarized the phase equilibrium characters, the ice crystallization behaviors, especially, the ice crystal transformation phenomena we discovered. From the angle of taking advantage of energy to a full extent, promoting efficiency and producing large ice crystals, we developed the new freeze concentration technique, in which all the characteristics and behaviors of ice crystallization beneficial to high efficiency and low energy consumption were taken into account and utilized appropriately in the process.

The present invention is on the basis of new principles and means different from those of the existing processes. To overcome the drawbacks of the existing freeze concentration processes, ice scraping and ice crystal ripening are avoided. In our new freeze concentration process the aqueous solution is refrigerated to a suitable, relatively high supercooling level without ice nucleation or without formation of ice layer on the heat exchanger surface and then instantaneous nucleation and catastrophic crystallization are induced for the solution in a nucleator to obtain fine ice crystals. Also importantly, in our new freeze concentration process ice crystal transformation and agglomeration, instead of ripening of ice crystals, proceed at very high rate under controlled endo/exothermal balance conditions to produce large, grain- or sphere-shaped ice crystals.

SUMMARY OF THE INVENTION

The present invention overcomes the limitations of the prior art by (1) avoidance of ice scraping in the refrigeration of solutions with high efficiency, thanks to supercooling the solutions without nucleation in the bulk or without ice formation on the heat transfer surface, as well as thanks to the instantaneous nucleation, (2) use of endo/exothermal balance dominated ice crystal growth, transformation and agglomeration to efficiently produce large and grain- or sphere-shaped ice crystals, which are easily and completely separated from the mother solution, (3) rational arrangement of process steps with refrigeration of solutions and ice crystallization at suitable concentration ranges to establish driving force as high as possible for growth, transformation and agglomeration of ice crystals with a high efficiency, and (4) more precise control of the freeze concentration process in every step based on the kinetic relationships of ice crystallization. The present invention, as shown in FIG. 1 illustrating its essential principles and methods, relates to a physical process to concentrate any aqueous solution by freezing and separating water from the solution. The purpose of the process is to obtain high quality concentrated aqueous solutions, or to obtain pure water, or to obtain both with lower energy consumption and at higher efficiency, hence for less capital cost.

By taking advantage of the characteristics that water and aqueous solutions can be supercooled below their freezing point without any phase transition, in the present invention aqueous solutions are supercooled to a metastable status without nucleation, or supercooled without ice formation on the heat transfer surface (in the bulk solutions instead). According to the generally accepted concept that the nucleation rate is proportional to the supercooling square, but growth rate is only linear to the supercooling, in the case of highly supercooled solution, nucleation rate will be very high and catastrophic formation of ice crystals will happen, once the nucleation is triggered. In the present invention, supercooled aqueous solution is introduced with ice crystals in a nucleator and instantaneous nucleation occurs to produce a lot of fine ice crystals and to make the solution concentrated. To obtain high efficiency for nucleation and concentration, a suitable high supercooling level is used in the process of the present invention. The obtained high supercooling level could be quite different even for the same material since there are many affecting factors. Based on our research findings, gradual cooling with suitable rates in the initial stage of refrigeration is employed to establish a higher supercooling level of solutions without nucleation, or without ice crystal formation on the heat transfer surface. Once the desired supercooling level is reached, steady operation can be continued by stably maintaining the operating parameters.

In the present invention, a technique of ice crystal growth, transformation and agglomeration is used to produce large ice crystals, which are easily separated from the mother solution and without inside entrainment of the mother solution. The ice crystal growth, transformation and agglomeration are controlled by use of suitable operating parameters in a multi-function crystallizer to maintain individual ice crystals keeping their rapid growth and grain/sphere shape while to promote the melting of the non-growing ice crystals, which have melting potentials. This technique is on the basis of our findings on the behavior and characteristics of ice crystallization that when two or more ice crystals are co-existing in a solution, with contact or without contact, certain ice crystals grow while certain ice crystals melt due to the differences in their growing status, temperature, concentration of the corresponding mother solution, endo/exothermal circumstances, etc. We also found that agglomeration of large ice crystals occurs in ice suspension, when their growth rates are very high and a lot of heat is released. In this case, much larger ice crystals are formed by agglomeration of two or more crystals without inside entrainment of liquid. The ice crystal growth, transformation and agglomeration are based on the endo/exothermal relationship, or a mechanism associated to the absorbance and release of phase transition heat. They are endo/exotherm dependent and different from ripening, which occurs efficiently only when crystals to be melted have sizes small enough.

In the present invention, more precise control of the optimal dynamic balance among heat release, heat withdraw and total surface area of ice crystals is applied. We found that the stable growth, transformation and agglomeration of ice crystal are maintained under and dominated by a dynamic balance between the heat withdraw driven by heat transfer and the melting of certain ice crystals and the heat release due to the formation of ice. The total surface area of ice crystals plays an important role in the dynamic balance. In fact, different dynamic balances with different (low, medium, high, etc.) heat withdraw/release rates, different (low, medium, high, etc.) crystallization rates (i.e. rates of growth, transformation and agglomeration of ice crystals) and different ice crystal morphologies and size distributions can be established by control of operating conditions.

Therefore, in the present invention, rapid ice crystal growth, transformation and agglomeration, leading to the production of large, grain- or sphere-shaped ice crystals, can be realized by using a large driving force resulting in much higher efficiency as long as the balance of heat withdraw/release and mass transfer at a high rate level and the corresponding total surface area of ice crystals are maintained.

To make a complete process feasible and efficient, combination of the above-mentioned principles and means are carefully designed in the present invention as shown in FIG. 1. Appropriately deep refrigeration of an aqueous solution is used to prepare a supercooled, metastable solution. Then, instantaneous nucleation is induced by seeding to the supercooled, metastable solution to produce fine ice crystals and to make solution concentrated. Separation of the ice portion from the mother solution, which has higher concentration and will be as concentrate product, provides fine ice crystals, which have melting potentials, for the needs of transformation of ice crystals. At the same time suitable amount of growing ice crystals is created and maintained in the suspension. The original aqueous solution to be concentrated and the produced fine ice crystals are introduced to the suspension with growing ice crystals and growth, transformation and agglomeration of ice crystals take place at a high rate in a well-controlled endo/exothermal environment to obtain large ice crystals. The mother solution will be the feed for the above-mentioned refrigeration procedure. The principles and methods shown in FIG. 1 are essential, however, their arrangement can be flexible.

The fundamental arrangement of major steps and the operation for the process are shown in FIG. 2 and described as below.

After precooling, the original solution is (1) used to wash the large ice crystals produced in the process and then, or (2) directly if necessary, transported to a multi-function crystallizer. At the same time small ice crystals, produced in the process and having melting potentials, also enter the crystallizer, where they merge with the suspension containing growing ice crystals. Based on the above-mentioned principles, the endo/exotherm-related growth, transformation and agglomeration of ice crystals proceed at an optimal high rate for the dynamic heat and mass transfer balances by control of suitable operating conditions, and large ice crystals are formed. So, the original solution is preliminarily concentrated by the ice crystallization in the multi-function crystallizer. After separation from ice crystals, the preliminarily concentrated solution is transported to a tank and mixed with the recirculating concentrate produced in the process. The mixture is then transported to and supercooled in a heat exchanger to a suitable high supercooling level but without ice nucleation, or without ice formation on the heat transfer surface. The supercooled solution is transported into a nucleator where ice crystal seeds exist and agitation is applied. Due to high supercooling level, instantaneous nucleation and crystallization occur and a lot of fine ice crystals are generated in the nucleator. In the case of ice formation in the bulk solution by supercooling, further nucleation and crystallization proceed in the nucleator. The produced fine ice crystals are then separated from the solution by use of a vacuum or other type filter. Part of the concentrated solution will be the product and the rest is recirculated back to the refrigerating heat exchanger. The wet small ice crystals, as well as the original solution are transferred to the multi-function crystallizer containing a suspension with growing ice crystals for growth, transformation and agglomeration of ice crystal as described above. The multi-function crystallizer is equipped with separation devices, which can separate the large crystals from the mother solution and small crystals. The obtained large ice crystals are then washed by using the precooled original solution. The preliminarily concentrated solution obtained from the multi-function crystallizer is separated from ice crystals and then transported to the refrigerator as described above. If it is necessary, method by melting the surface ice of the crystals, which, usually, occurs automatically as ice crystals are exposed in an environment with higher temperature, can be used to recover the solute completely. The washed large ice crystals are used for precooling the original solution. The water obtained from melting of the large ice crystals will be as product if purification of water is the objective of the process. The arrangement of steps shown in FIG. 2 can be flexible.

Operation for the process showed and described above is an arrangement for a continuous, single-stage freeze concentration. Flexible, multistage arrangements can also be employed to suit to different materials and meet requirements of higher concentration. Optimal operating parameters are varied and dependent on the properties of materials, product requirements, manufacture scale, etc.

Compared to the existing freeze concentration technology, energy consumption in the process of the present invention is greatly reduced, because ice scraping is avoided in the refrigerating heat exchanger for supercooling and the energy potential (the removed heat) is almost fully used for dewatering in each step. The efficiency in the present process is much higher than that in the existing technology due to 1) the rapid crystal growth, transformation and agglomeration in the multi-function crystallizer to produce large ice crystals, 2) the elimination of ice layer formation on the heat transfer surface of the refrigerating heat exchanger to improve heat transfer, 3) the instantaneous nucleation and crystallization in the nucleator to produce fine ice crystals and 4) the easy and complete ice crystal separation and washing to recover solute and water.

DETAILED DESCRIPTION OF THE INVENTION

Figure 1:
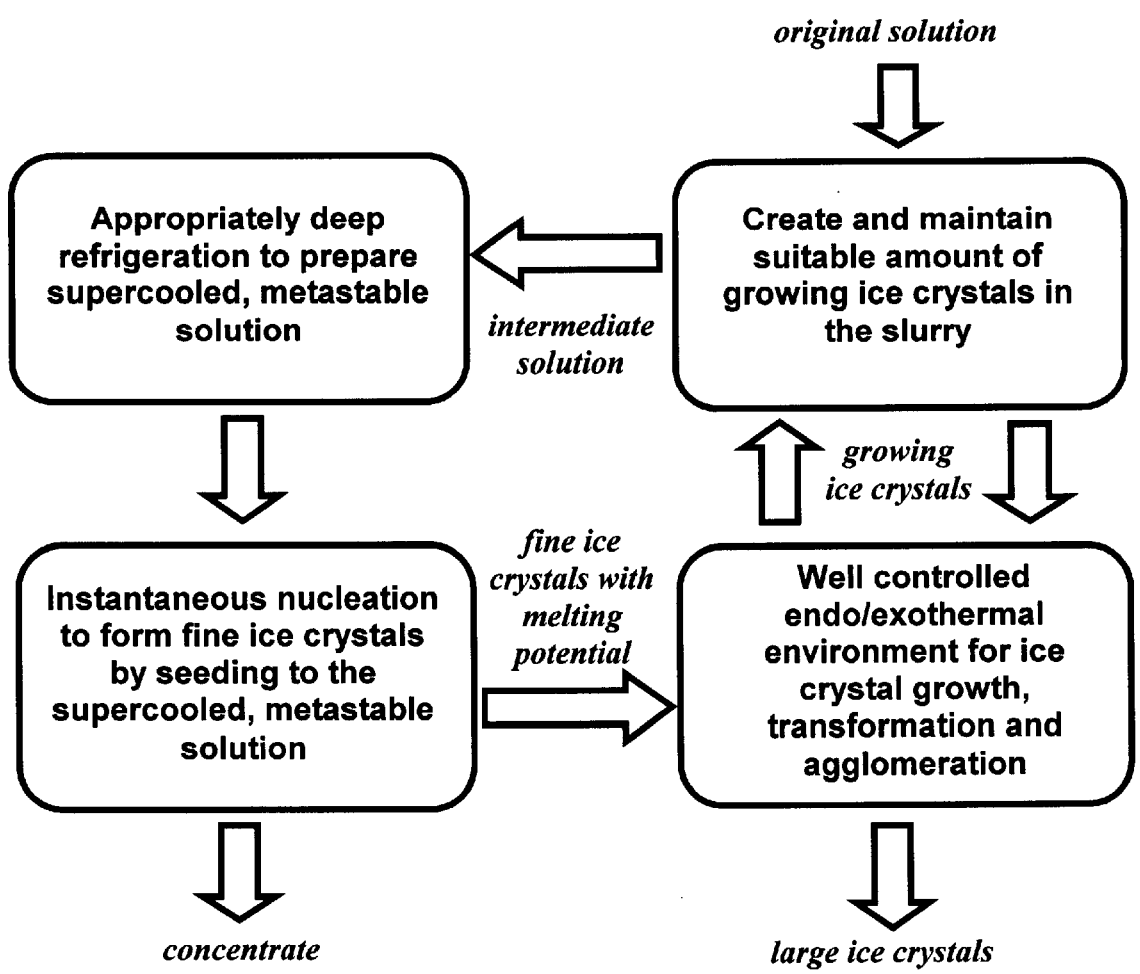
FIG. 1 illustrates the combination of the essential principles and methods employed in the present invention.
Figure 2:
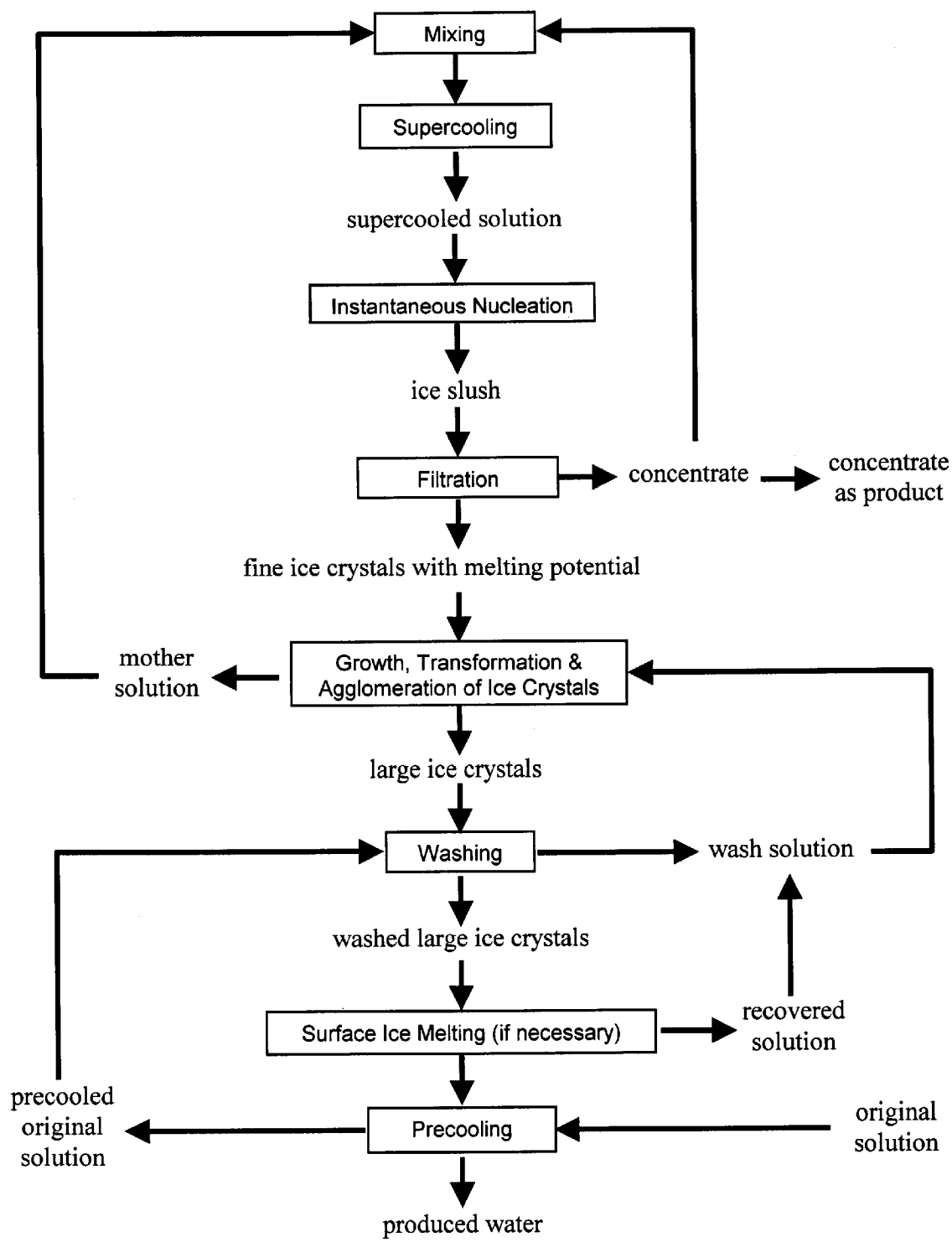
FIG. 2 is a schematic illustration of a fundamental arrangement of steps for the TD-driven (temperature difference-driven) freeze concentration process for aqueous solutions in the present invention. It shows the steps including supercooling of the solution, instantaneous ice nucleation, separation of fine ice crystals from the mother solution, ice crystal growth, transformation and agglomeration, separation of large ice crystals from the mother solution, etc.

Freeze concentration of aqueous solutions is a physical process, which removes water and makes the solutions concentrated by freezing and crystallizing water into ice and separating ice crystals from the mother solutions. Usually, steps of refrigeration of the solutions, ice crystallization and separation of ice crystals from the mother solutions are necessary for a freeze concentration process. The requirements for a freeze concentration process commercially feasible should include efficient heat transfer to refrigerate aqueous solutions, efficient crystallization to produce pure, uniform and large ice crystals for easy separation and complete solute recovery, as well as low energy consumption. Therefore, understanding the mechanism and behavior of ice crystallization in aqueous solutions and hence applying the fundamentals beneficial to the above-mentioned requirements to the freeze concentration process are very important.

The principles applied to the present invention are described as below.

Supercooling, Metastable Solution and Instantaneous Ice Nucleation

Under conditions of thermodynamic equilibrium, phase transition between liquid state and solid state occurs at a temperature called solidifying point or melting point. For the transition from water to ice, the phase equilibrium temperature is the freezing point. However, supercooling that materials are kept in their liquid state at temperatures below their solidifying points is a common phenomenon. Like many materials, water and aqueous solutions can be supercooled below their freezing points (i.e. the phase equilibrium temperature) without any phase transition from water to ice. The supercooled solution is in a metastable status, which may exist for a quite long period of time. The supercooling level (or supercooling as a short) of an aqueous solution is usually expressed by the temperature difference between the freezing point and the bulk temperature of the solution. The metastable status can be broken or destroyed and ice crystallization occurs when certain factors, for example fluctuation of temperature, especially, addition of ice crystals as seeds, are introduced. Instantaneous nucleation and catastrophic ice crystallization will occur, as a metastable aqueous solution with a high supercooling level is introduced with ice crystal seeds. According to the generally accepted concept that the nucleation rate is proportional to the supercooling level square, but growth rate is only linear to the supercooling level, in the case of highly supercooled solution, instantaneous nucleation and catastrophic crystallization will produce a lot of fine ice crystals and make the solution concentrated. The higher the supercooling level, the more the ice crystals can be produced and the higher the concentration of the solution can be reached.

The supercooling levels obtained could be quite different even for the same aqueous solution. Many factors, for example, material and smoothness of heat transfer surface and dynamic characters of cooling, may affect the obtained supercooling level associated with the metastable status. In the process of the present invention, simple heat exchangers in a counter-current operation manner are used. In the initial stage of refrigeration, gradual and accurately-controlled cooling is employed to establish a high supercooling level of solutions without ice nucleation, or without ice crystal formation on the heat transfer surface. At the beginning of the initial stage of refrigeration, higher cooling rate can be used to promote efficiency. As the temperature of aqueous solution is below its freezing point, cooling rate is controlled at a lower, suitable level to benefit to the establishment of metastable status for the solution. Once the desired supercooling level is reached, steady operation can be continued by stably maintaining the operating parameters. The cooling program and the suitable parameters for obtaining a high supercooling level may be different depending on different aqueous solutions and heat transfer equipment and conditions. In the present invention, a nucleator is used for instantaneous nucleation and crystallization by taking advantage of the existence of ice crystals, which will be as seeds, in the nucleator and the high supercooling level of the solution. The size of nucleator can be quite small and the nucleation process can be completed efficiently thanks to the high rate because of a high driving force (supercooling level).

For certain aqueous solutions with higher concentration, the rate of ice nucleation is greatly reduced due to the high viscosity of the solutions, even if the ice nucleation has occurred. In this case, the formed small ice crystals exist in the bulk solution, instead of on the heat transfer surface, since the slurry still can flow in the heat exchanger under the function of a pump. Greater driving force for the refrigeration can be used in this case to promote the efficiency of heat transfer without worrying about ice formation on the heat transfer surface. In addition, for certain aqueous solutions introduction of nucleating agents (e.g. some nucleating bacteria) can also cause formation of small ice crystals in the bulk solution, instead of on the heat transfer surface. Similarly, greater driving force can also be used for this case to promote the efficiency of heat transfer. To take advantage of these characteristics, in certain cases (e.g. for aqueous solution with higher concentration or with introduction of nucleating agents), highly supercooled solutions can be obtained with limited formation of ice crystals in the bulk, instead of on the heat transfer surfaces,.

By summing up, for the objectives of refrigeration—removing heat from the solution and generating small ice crystals, the principles and features in the present invention are the avoidance of ice nucleation, or ice formation on the heat transfer surface, the production of highly supercooled solutions and instantaneous ice nucleation. With these principles and features, instead of scraped surface freezer with scraping device, simple regular heat exchangers (e.g. tube-in-tube, shell and tube, plate, etc.) plus a small nucleator can be used. The energy for the scraping work and for the refrigeration to remove heat due to friction in a scraped surface freezer will be saved and hence the capital cost for the equipment can be reduced. The energy consumed in the refrigeration of the present process is stored as a potential in the solution having a low temperature (high supercooling level), which will be fully used without loss for nucleation and ice crystal growth, transformation and agglomeration in the later steps. In addition, higher heat transfer coefficient for the heat exchanger can be obtained, because there is no ice layer on heat transfer surface. The driving force for the refrigeration in the present process may be limited by the requirement of no ice nucleation for certain cases because of high supercooling level. However, in other cases, particularly in the cases of solution with higher concentration, higher driving force can still be used with no formation of ice on the heat transfer surfaces.

Growth, Transformation and Agglomeration of Ice Crystals

As described in the section of 'Background of the Invention', ripening phenomenon is based on the classical thermodynamic theory and employed in the existing freeze concentration process to produce large ice crystals. Instead of ripening that melting and growth of ice crystals will depend upon their size according to the Gibbs-Thomson equation, techniques of ice crystal growth, transformation and agglomeration are used in the present invention to obtain large ice crystals, which are easily separated from the mother solution and without inside entrainment of the mother solution. Ice crystal growth, transformation and agglomeration in the process of the present invention are fully different from ripening in their causes, behavior and characteristics.

For phase transition between water and ice, water molecules can be orderly arranged in a state of neither liquid nor solid. This 'mid-structure' or 'intermediate' state is unstable. It may be changed to liquid water or turned to solid ice, depending upon the conditions of its thermal environment. For ice crystallization, the existence of a mid-structure layer around the ice crystals plays an important role. For example, the growth of ice crystals with planar or grain shape is completed by the propagation of repeated steps of formation—solidification of the mid-structure layer, i.e. step-by-step mechanism. First, a mid-structure layer is formed by cooling. Then the layer is solidified into ice and the phase transition heat is released. The heat is withdrawn by cooling and a new mid-structure layer is formed. The procedures are repeated and the ice crystals grow following a wave-like step-by-step mechanism. Therefore, the growth rate of ice crystals depends on the frequency of the steps and the spacing of the steps, which further depends on the amount of material forming the mid-structure layer. We found that mid-structure material can be formed either by supercooling water or by melting ice crystals and the amount of mid-structure material can be controlled to promote ice crystallization. These are of great significance in control of and enhancement of ice crystal growth. In addition, under certain conditions, when two or more ice crystals, which have mid-structure layers, are brought into contact they will unite together. This is because the existence of the mid-structure layers around their surface and the mid-structure layers are solidified to form a solid ice bond. All these indicate there is a mechanism, which is different from that for ripening, related to the heat release/absorbance for the phenomena of melting and growth of ice crystals.

We found that under certain conditions the melting and growth of ice crystals were related more to factors other than the crystal size. When two or more ice crystals are co-existing in static or dynamic status, with contact or without contact, transformation that certain ice crystals grow while certain ice crystals melt due to the differences in their growing status, temperature, concentration of the corresponding mother solution, endo/exothermal circumstances, size and morphology, may occur. Here are some examples. (1) If an ice crystal is in a status of growing and a nearby ice crystal is in a status of non-growing, the former will keep growing while the latter will be melted. Growing or melting depends on the growth status of the crystal, instead of its size. (2) Melting of some crystals can cause other ice crystals in the vicinity to grow because the endothermal effect of melting of ice crystals removes heat from their vicinity and the mid-structure material is formed by melting of ice crystals providing beneficial conditions for phase transition from water to ice. (3) When an ice slurry containing small ice crystals with lower temperatures meets growing ice crystals in a suspension at higher temperature, small crystals in the slurry will be melted and the growing crystals will keep growing rapidly under dynamic conditions. This is because the ice slurry at low temperature has a great melting potential and the large temperature difference between the slurry and the suspension promotes the melting of the small ice crystals in the slurry, and in reverse, the endothermal effect from the melting promotes the growth of the growing ice crystals. In this case, the melting potential of fine ice crystals is called temperature difference-related (TD-related as a short, hereinafter) melting potential. (4) When an ice slurry containing small ice crystals and the corresponding mother solution with a lower concentration meets growing ice crystals in a suspension with a much higher concentration, small crystals having a melting potential in the slurry can be melted and the growing crystals will keep growing rapidly under dynamic conditions. In this case, the melting potential of fine ice crystals is called concentration difference-related (CD-related as a short, hereinafter) melting potential. (5) Melting status of some crystals can be ended and reversed to growing status when their local thermal environment (temperature, heat balance, etc.) changed. In this case, the larger the ice crystal, the higher the survival possibility from melting and the higher the possibility of status reversal. By summing up, the transformation of ice crystals may occur in various manners. It is essentially different from the phenomenon of ripening.

We also found that agglomeration of large ice crystals occurs in an ice suspension when their growth rates are very high and a lot of heat is released. In this case, much larger ice crystals with grain or spherical shape are formed by agglomeration of two or more crystals without inside liquid entrainment. The mechanism of ice crystal agglomeration is based on the bonding of mid-structure layers of ice crystals as described above. Since the material of mid-structure layers is composed of only water molecules, when they are solidified into ice to bond ice crystals together, no solution will be entrained.

The existence of mid-structure materials, which are flowable, in the system makes the transformation and agglomeration of ice crystals more efficiently, because under dynamic conditions the mid-structure materials can be directly delivered from small ice crystals with melting potentials onto the growing ice crystals and the mid-structure layer between ice crystals can be solidified resulting in agglomeration. This promotes the linear growth rate of ice crystals with grain/sphere shape by several times.

The mechanism of transformation and agglomeration is related to complex factors and is not limited by the crystal size. Therefore, when ice crystals are larger than a certain size and the Gibbs-Thomson equation is not in effect, ice crystallization will be dominated by the mechanism of growth, transformation and agglomeration interpreted in the present invention.

To apply the mechanism to the present invention, the ice crystal growth, transformation and agglomeration are controlled by use of optimal operating parameters in a multi-function crystallizer to maintain individual ice crystals keeping their rapid growth and grain/sphere shape while to promote the melting of the non-growing ice crystals, which have melting potentials. These will be discussed in detail later in this section.

Heat Transfer, Mass Transfer and Ice Crystallization Kinetics

The ice crystallization rate in terms of mass per unit time is proportional to the heat flow resulted from the heat transfer. The average linear growth rate of ice crystals in terms of micrometers per unit time is related to many factors, in which the total surface area of the existing ice crystals plays an important role. With a certain mass crystallization rate and a certain amount of existing ice crystals, ice crystals with less number but larger size, which have smaller total surface area, will have higher average linear growth rate than that for those with more number but smaller size. However, for individual ice crystals with different shapes, which lead to different specific surface areas (surface area/unit volume, $m^2/m^3$), the one with higher specific surface area (e.g., disk versus sphere) will have higher crystallization rate in terms of mass (or volume) increase per unit mass. Since there are so many factors influencing the ice crystal growth, the crystallization circumstances in the ice crystallizer are very complex. To make control of ice crystallization at high efficiency possible, key issues must be identified.

We found that in a crystallizer the growth of ice crystals is controlled by a dynamic balance among the heat withdraw rate, driven by cooling via a heat transfer device and the melting of some crystals, and the heat release rate due to the phase transition from water to ice. And the total surface area of ice crystals, which is determined by number, size, shape and ice suspension density (grams of ice /unit volume of the suspension) of the ice crystals and is in its dynamic (increasing or decreasing) status, has significant effect on the heat withdraw/release balance. A system must be in a balanced status with that the heat withdraw rate equals the heat release rate. Ice crystals existing in the system will grow (with or without melting of some ice crystals) in a manner that the change of their total surface area should automatically keep in a relatively stable state of the dynamic balance. If a system is basically in a balanced status, ice crystals will grow in a manner that the total surface area of crystals increases as less as it can so that the irregular shapes of ice crystals will tend to become spherical since the spherical crystals have the smallest specific surface area. If a system is not in a balanced status, it has a trend to approach a new balance by means of changing the total surface area of the ice crystals, hence the crystal growth rate. For example, if the heat withdraw rate is higher than the heat release rate, the growth of ice crystals in the system will follow a manner that the total surface area of the crystals increases more rapidly, resulting in a lot of new small ice crystals, even dendrites. This is beneficial to the integration of water molecules onto the ice surface, and sequentially the heat release rate increases. Eventually, this makes the system turn to a new balanced state with higher crystallization rate. In fact, different dynamic balances with different heat withdraw/release rates (low, medium, high, etc.), which result in different crystallization/crystal growth rates (low, medium, high, etc.) and different ice crystal morphologies/size distributions, can be established under different operating conditions. Therefore, the formation of large, grain- or sphere-shaped ice crystals can be realized not only at a low rate, but also at a high rate resulting in much higher efficiency as long as the balance of high rates of heat withdraw/release and corresponding total surface area are maintained.

Figure 3:
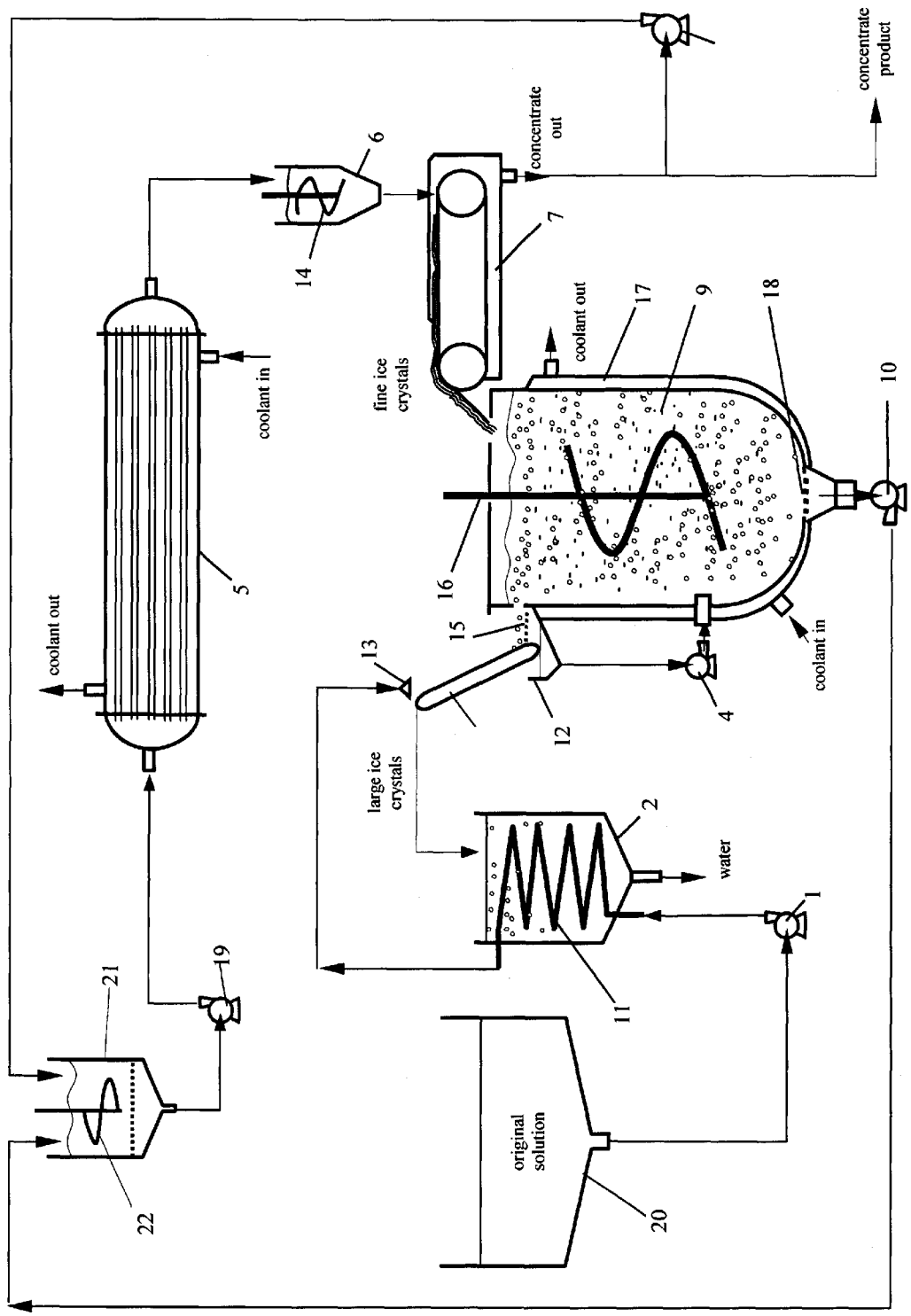
FIG. 3 is a schematic illustration of a single-stage freeze concentration process corresponding to the arrangement in FIG. 2 for aqueous solutions embodying the present invention with combined units for heat exchange, nucleation, filtration, crystal growth, transforming and agglomeration, separation of fine and large ice crystals from the mother solutions and washing.

In the present invention, techniques of building dynamic balances between heat withdraw and heat release with high rates by use of optimal operating parameters are applied in the multi-function crystallizer. The optimal operating parameters may be varied depending upon kind of material, concentration, type of crystallizer, etc. They can be determined by bench scale technological experiments By applying the principles described in this section, an embodiment of the present invention for a single-stage freeze concentration process is shown in FIG. 3. The fine ice crystals involved in the transformation of ice crystals in this embodiment have a temperature difference-related melting potential. In practice, before freeze concentration begins, the optimal technological operating parameters in all steps of the process for a specific aqueous solution must be determined via experiments.

Figure 4:
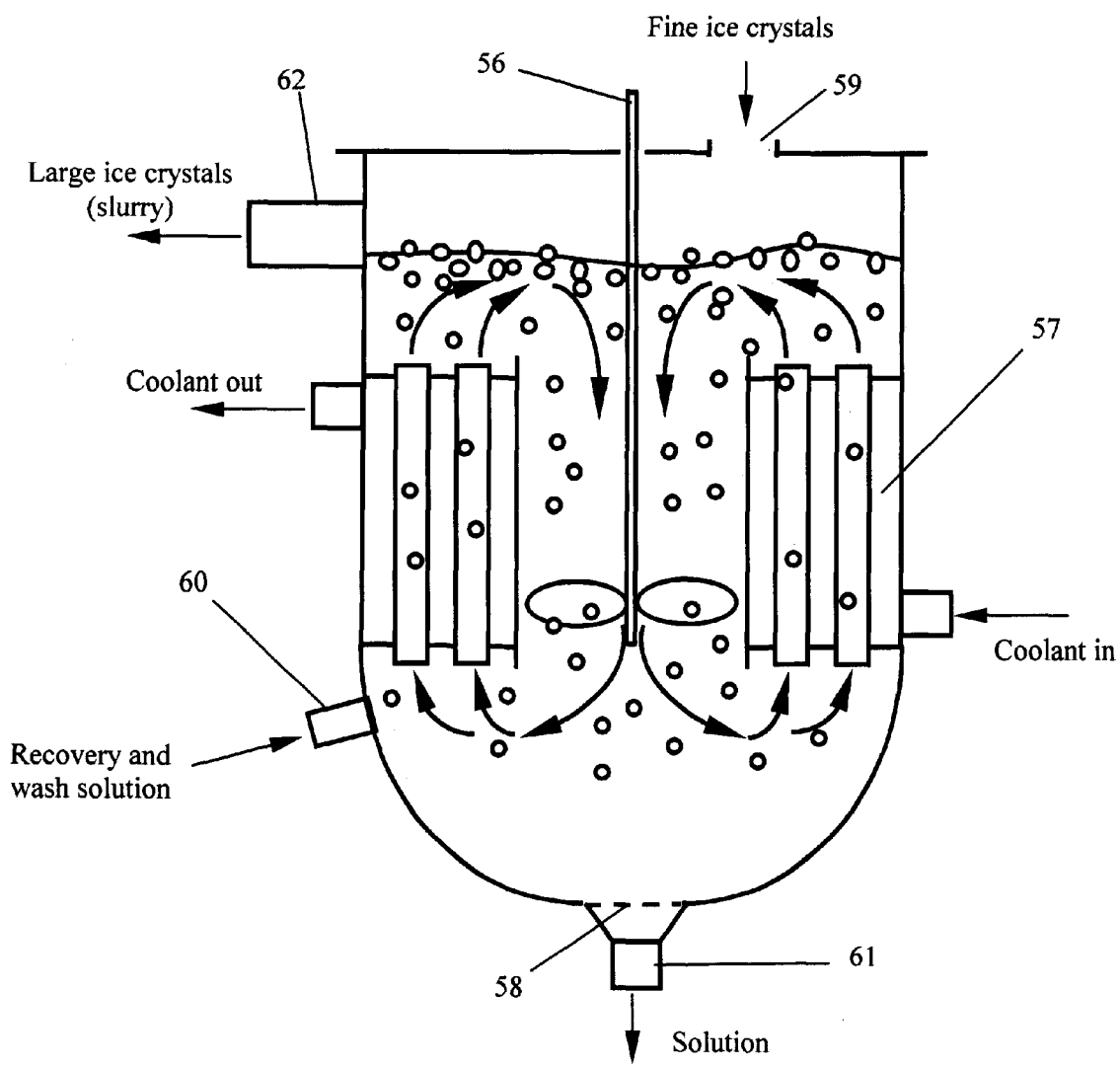
FIG. 4 is a schematic illustration of a multi-function crystallizer consisting of a central circulating propeller, a built-in annular shell and tube heat exchange unit, a segregating screen, an inlet for fine ice crystals, an inlet for recovery and wash solutions, an outlet for the concentrated solution and an outlet for large ice crystal slurry connected to a ice crystal-solution separating device (not shown).

The original aqueous solution stored in the storage tank 20 is preferably transported via the pump 1 to and precooled in the heat exchanger 2. The heat exchanger 2 may be in any suitable type, shown in FIG. 3 is a coil cooler with ice water as a coolant, which is from melting of the produced large ice crystals. The obtained water from melting of the large ice crystals will be as product if purification of water is the objective of the process. Precooling of the original solution can take advantage of the cooling potential of large ice crystals so as to utilize energy more efficiently. The temperature of precooled original solution should be as low as possible. After precooling and via a distributing device 13, the precooled original solution is used to wash the large ice crystals, which are produced in the process, on a conveying device 3 and to recover any solute existing in the mother solution adhering to the surface of large ice crystals. If necessary, additional washing by water from the self-melting of the surface layer of the large ice crystals can be used to completely recover the solute. Then, the wash solution is mixed with the mother solution, which is separated from the large ice crystals in a separating device 12 of the multi-function crystallizer 9. The mixed solution is transported into the multi-function crystallizer by a circulating pump 4. If the recovery of solute and the washing of large ice crystals are not necessary, the precooled original solution can be directly mixed with the mother solution. At the same time while the mixed solution is pumped in, fine ice crystals, which is produced in the process and having melting potentials, also enter the multi-function crystallizer 9, where they merge with the suspension containing growing ice crystals. In the multi-function crystallizer 9, growth, transformation and agglomeration of ice crystals occur and proceed at an optimal high rate for the dynamic mass and heat transfer balances by control of suitable operating conditions according to the principles described earlier in this section. The type, structure and capacity of the multi-function crystallizer may be different depending on the properties of aqueous solution and slurry, scale of manufacture, etc. However, a multi-function crystallizer should be equipped with refrigerating device for heat withdraw, separating device for separation of large ice crystals and the mother solution, agitating device to maintain the dynamic status of the material and segregating device to keep the completed solution and the suspension apart. In fact, in the multi-function crystallizer, fine ice crystals are transformed to large ones (i.e. transformation), new ice phase is formed and integrated onto existing ice crystals (i.e. crystallization) and dilute solution is concentrated by the crystallization of ice and the mixing with the thick solution brought by fine ice crystals (i.e. concentration). This combination of crystal transformation, ice crystallization and concentration is beneficial to the use of material, energy and equipment in a full extent. In addition to these functions, the crystallizer should also have functions of heat transfer, separation of large crystals from the mother solution, segregation of the completed solution and the suspension, etc. Shown here in FIG. 3 is a simple multi-function crystallizer, which may suit to the requirement of applications in a small scale. It has a central agitator 16, a cooling jacket 17, a segregating screen 18 and an ice crystal/solution separator 15 connected to a tangent outlet at the top of the crystallizer. For applications in a large scale, a multi-function crystallizer shown in FIG. 4 can be used. It has a central circulating propeller 56, a built-in shell and tube heat exchanger 57, a segregating screen 58, an inlet 59 for fine ice crystals, an inlet 60 for recovery and wash solutions, an outlet 61 for the preliminarily concentrated solution and an outlet 62 for the slurry containing large ice crystals connected to a ice crystal-solution separating device. In the multi-function crystallizer, when fine ice crystals with melting potentials meet the suspension containing growing large ice crystals, endo/exotherm-related transformation and agglomeration of ice crystals take place and proceed according to the above-described principles. The process proceeds and large ice crystals with grain/sphere shape are formed rapidly because the driving force (temperature difference between small and large ice crystals) is very large and the heat withdraw/release balance is maintained at a high rate level. So, the original solution is preliminarily concentrated by the ice crystallization in the multi-function crystallizer. The preliminarily concentrated mother solution is kept apart from the suspension by means of the segregating screen 18 and transported by pump 10 to the mixing vessel 21 having an agitator 22, where it merges with the recirculating concentrate produced in the process. The mixture is then transported by the pump 19 to the heat exchanger 5, where it is supercooled to a suitable high supercooling level without ice nucleation, or without ice formation on the heat transfer surface by precise control of the stable operating parameters, which are established by using gradual cooling program with suitable operating parameters in the initial stage. The type, structure and capacity of the heat exchanger may be different depending on the properties of aqueous solution and scale of manufacture. However, to benefit to the requirement of avoidance of ice nucleation or ice formation on the heat transfer surfaces, counter current operation and smooth heat transfer surfaces are necessary. Shown here in FIG. 3 is a shell and tube heat exchanger with aqueous solution in the tube path and the refrigerant in the shell path. After supercooling, the supercooled solution enters the nucleator 6 equipped with an agitator 14, where instantaneous nucleation and crystallization occur and proceed due to the high supercooling level of the solution and the existence of seed ice crystals in the suspension. A lot of fine ice crystals are generated and the solution is concentrated according to the principles described earlier in this section. To assure a complete, instantaneous nucleation/crystallization and to fully use the energy, the nucleator 6 should be well insulated. The produced fine ice crystals are then separated from the solution by use of a continuous vacuum filter 7. Shown here in FIG. 3 is a continuous vacuum filter, which has a moving belt equipped with filtration medium. A modified continuous drum vacuum filter can also be used. After the filtration, part of the obtained concentrate will be the product and the rest is recirculated back to the mixing vessel 21 as mentioned above. The obtained fine ice crystals, having usually concentrated solution entrained, are directly transferred to the multi-function crystallizer 9 for growth, transformation and agglomeration of ice crystals as described above.

The step of growth, transformation and agglomeration of ice crystals is one of the key steps in the system and its process is the most complex. To make efficient and perfect growth, transformation and agglomeration of ice crystals, some technological arts are employed as described below.

In the initial phase of the operation, growing ice crystals are created by following the step-by-step mechanism of ice crystallization. The aqueous solution with a certain concentration is gradually cooled by coolant with a temperature around the freezing point of the solution. As the temperature of the solution is just below its freezing point, seed ice crystals are introduced into the solution for growth. The amount of seed ice crystals is determined by their mean size so as to provide an appropriate total surface area of ice crystals. After the growth of ice crystals starts, the coolant temperature is gradually decreased to enhance heat transfer and promote the growth rate of ice crystals until it reaches the optimal value. Then, fine ice crystals are added in the suspension gradually and increasingly for transformation of ice crystals. Increase of growth rate will lead to occurrence of agglomeration. When optimal high rate of ice crystal growth, transformation and agglomeration is reached, the operating parameters should be maintained for the operation to continue steadily. To shorten the time for setting up the optimal operation status, large ice crystals (e.g. the product ice crystals of the process) can be directly added in the solution as seeds. Similar technique can be applied to re-create growing ice crystals in the case of that a steady operation is accidentally destroyed.

Difference between the temperature of fine ice crystals and the temperature of bulk suspension where large growing crystals exist is beneficial to rapid ice crystal transformation. For example, for sucrose solutions, as the concentration of bulk solution in the multi-function crystallizer is 10%, 15% and 20% with the corresponding temperature of $-0.67°$ C., $-1.07°$ C. and $1.67°$ C., respectively, the concentration of the concentrated solution brought by the fine ice crystals is 20%, 30% and 40% with the corresponding temperature of $-1.67°$ C., $-3.0°$ C. and $-5.0°$ C., respectively. In this way, the driving force (temperature difference) will be $1.0°$ C., $1.9°$ C. and $3.3°$ C., respectively. Compared with the driving force ($0.01$–$0.05°$ C.) in the ripening procedure of the existing freeze concentration process, about 60 times are promoted. So, much higher transformation rate can be expected.

In addition to the use of large driving force, low concentration of the bulk solution, which provides a good environment beneficial to higher supercooling potential, low viscosity and higher temperature differences between small and large ice crystals, hence, to the transformation, crystallization and concentration at a higher rate. In order to make growing ice crystals grow rapidly and to produce large ice crystals with grain/sphere shape and suitable size distribution, higher and suitable temperature difference for heat transfer based on the properties and concentration of different solutions and suitable feeding rate of fine ice crystals are used.

Besides, in order to control the total surface area of ice crystals at an optimal value, a suitable level of ice suspension density should be maintained according to the average size and distribution of ice crystals. For example, for sucrose solution a suitable suspension density is about 30% for an average crystal size of around 1 mm. Furthermore, because ice crystals with larger mean size ($\geq 1$ mm) and appropriate number of small ones are beneficial for the system to keep the heat/mass transfer balance at a high rate and to obtain easily-washable ice crystals. Also, suitable crystal size distribution (CSD) with larger mean size can significantly reduce the effect of the decrease of the total surface as the produced ice crystals are withdrawn and make the control of the total surface area much easier. The suitable crystal size distribution (CSD) is maintained in the multi-function crystallizer.

Finally, in the multi-function crystallizer of the present invention, the growing crystals are kept to continue growing without interruption. We found that once an ice crystal was reversed from a growing status to a non-growing status, it took time to turn it back to the growing status. Since the melting rate of fine crystals depends on the growth rate (or the heat release rate) of large growing crystals, it is best to make large crystals keep growing and, in return, to make fine crystals keep melting. This mutual promotion will benefit the transformation and result in a faster and faster process and the formation of agglomerates of ice crystals, if high, stable heat and mass transfer rates are provided. Unlike the existing freeze concentration process, in which multistage crystal growth is used and grown crystals are transport to the next crystallizer for further growth. To avoid the interruption of crystal growth caused by the transportation of ice crystals from one stage to another stage, in the present invention ice crystals grow to a desired size in one step by keeping growing crystals to continue their growth.

Refrigeration of solution in the heat exchanger 5 is another key step in the process and some technological arts are also employed. Higher concentration of the solutions is used for refrigeration. Solutions with higher concentration have lower freezing point. This means a much higher supercooling (or higher cold potential) can be obtained for the original solution to be concentrated, which has higher freezing point. Higher supercooling is important for decreasing the ratio of recirculating solution to original solution (e.g. every $1°$ C. of supercooling increase will reduce the ratio by about 1) and obtaining more ice in the next step.

Figure 5:
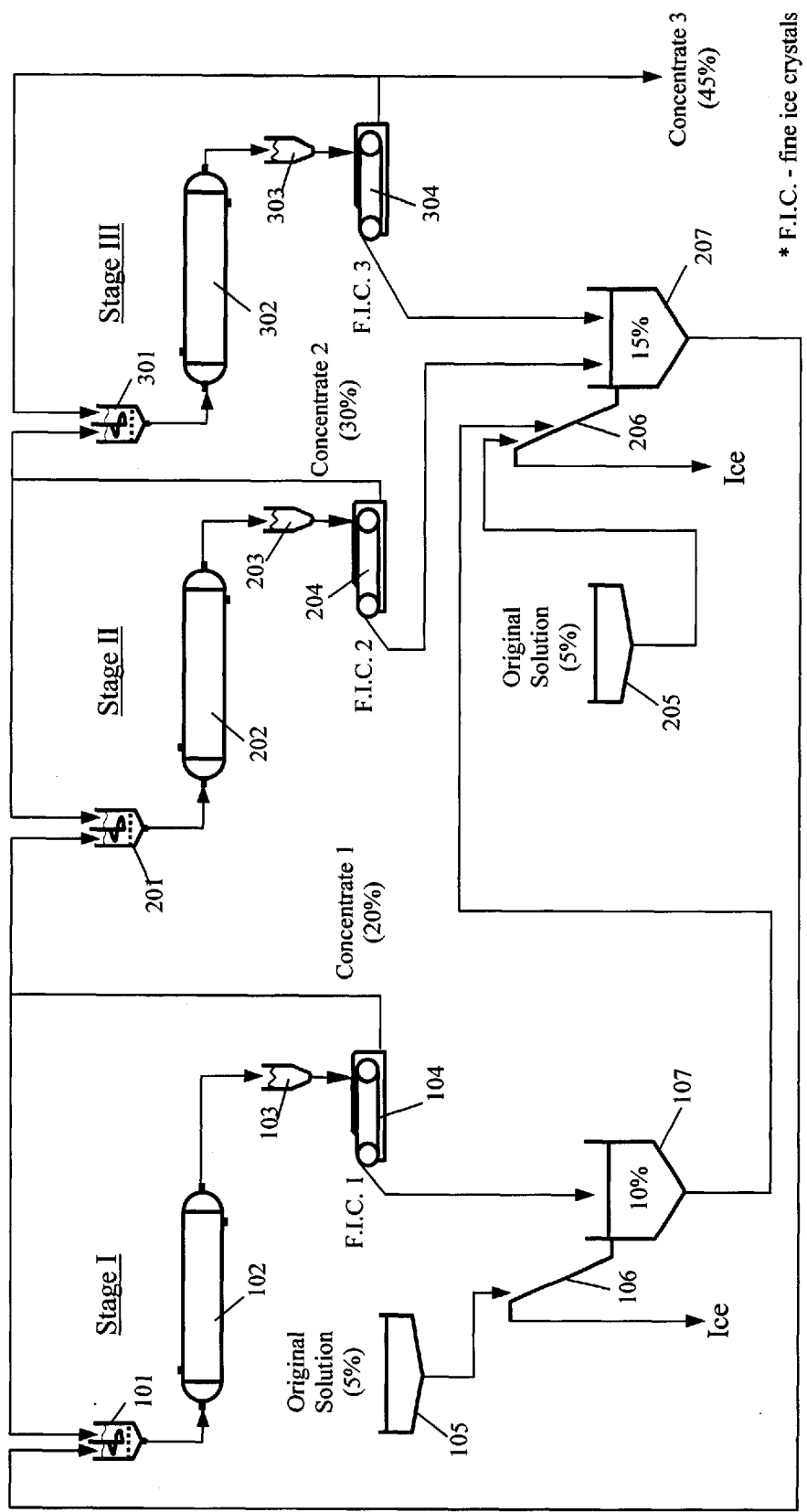
FIG. 5 is a schematic illustration for an example of a multistage freeze concentration process for aqueous solutions embodying the present invention with combined units for heat exchange, nucleation, filtration, crystal growth, transforming and agglomeration, separation of fine and large ice crystals from the mother solutions and washing.

The operation for the process showed and described is a continuous, single-stage arrangement with raw material of the original aqueous solution and obtained concentrate and water. If the concentration difference between the final concentrate product and the original solution is very large or the amount of solution to be treated is very large and one stage of freeze concentration can't reach the objective, multistage freeze concentration can be used. Optimal operating parameters are varied and dependent on the properties of materials, product requirements, manufacture scale, etc. FIG. 5 shows an example of operation arrangement for a three-stage freeze concentration with two multi-function crystallizers by use of the process of the present invention. To emphasize the key operation issues, the structure of apparatus is simplified and some equipment such as precoolers, pumps are not shown in the figure.

In the showed three-stage freeze concentration process, a sucrose solution is the aqueous solution to be treated. The process is based on the experimental results and the calculation of the material and heat balances. The original sucrose solution with a concentration of 5% is finally concentrated to 45% through three stages. For each stage the process and the equipment are similar to those for the single-stage operation.

In Stage I, the original solution with a concentration of 5% is transported from storage tank 105 to a conveying device 106 to wash the large ice crystals produced from multi-function crystallizer 107, where the original solution is preliminarily concentrated to a concentration of 10% by ice crystal growth and mixing with entrained solution of fine ice crystals. The obtained preliminarily concentrated solution is then transported to the washing device 206 for washing large ice crystals and input to the crystallizer 207. The fine ice crystals are provided from the continuous vacuum filter 104, by which the ice slurry, produced by instantaneous nucleation in the nucleator 103, is separated. The concentrate (Concentrate 1, 20%) obtained in Stage I is divided into two parts. One part is transported to Stage II for further concentration. Another part is recirculated back to the mixing vessel 101, where it merges with the mother solution (15%) from the multi-function crystallizer 207. The mixture having a concentration of about 19% is supercooled in the refrigerating heat exchanger 102 and the supercooled solution enters the nucleator 103 for instantaneous nucleation as described above.

In Stage II, part of Concentrate 1 is mixed in the mixing vessel 201 with part of the concentrate (Concentrate 2, 30%) obtained and recirculated in this stage. The mixture having a concentration of about 29% is supercooled in the refrigerating heat exchanger 202 and then the supercooled solution enters the nucleator 203 for instantaneous nucleation. The obtained slurry after nucleation is separated into fine ice crystals and Concentrate 2 by the continuous vacuum filter 204. Like in Stage I, one part of Concentrate 2 is transported to Stage III for further concentration and another part is recirculated back to the mixing vessel 201.

In Stage III, part of Concentrate 2 is mixed in the mixing vessel 301 with part of the concentrate (Concentrate 3, 45%) obtained and recirculated in this stage. The mixture having a concentration of about 43% is supercooled in the refrigerating heat exchanger 302 and then the supercooled solution enters the nucleator 303 for instantaneous nucleation. The obtained slurry after nucleation is separated into fine ice crystals and Concentrate 3 by the continuous vacuum filter 304. A part of Concentrate 3 will be the concentrate product and the rest is recirculated back to the mixing vessel 301.

One multi-function crystallizer 207 is used for the growth, transformation and agglomeration of ice crystals for both Stage II and Stage III. The obtained fine ice crystals from the continuous vacuum filters 204 and 304 are added into the crystallizer 207. At the same time, the preliminarily concentrated solution obtained in Stage I and the original solution in the storage tank 205 are used to wash the produced large ice crystals on the conveying device 206. And the wash solution is mixed with the mother solution and further concentrated in the crystallizer by the growth, transformation and agglomeration of ice crystals. The obtained concentrated solution (15%) is transported back to the mixing vessel 101 in Stage I for freeze concentration as described above.

Since two multi-function crystallizers are used in the three-stage freeze concentration process and each multi-function crystallizer is combined with other procedures similar to the steps for single-stage operation: precooling the solutions, washing the large ice crystals, self-melting of the large ice crystals, etc. So, this combination of procedures is, herein, referred as a procedure combination.

Figure 6:
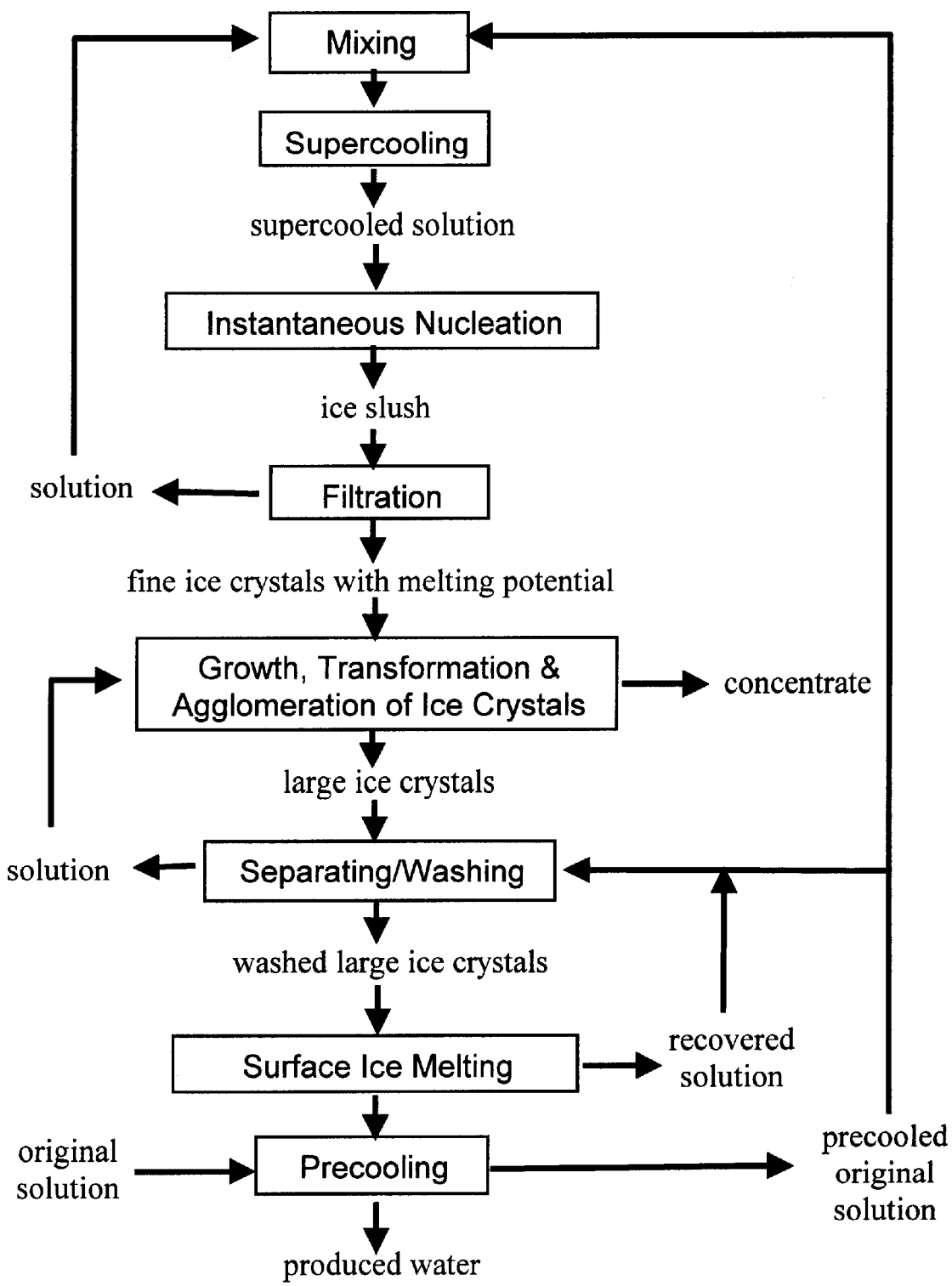
FIG. 6 is a schematic illustration for a fundamental arrangement of steps for the CD-driven (concentration difference-driven) freeze concentration process for aqueous solutions in the present invention. It shows the steps including supercooling of the solution, instantaneous ice nucleation, separation of fine ice crystals from the mother solution, ice crystal growth, transformation and agglomeration, separation of large ice crystals from the mother solution, etc.
Figure 7:
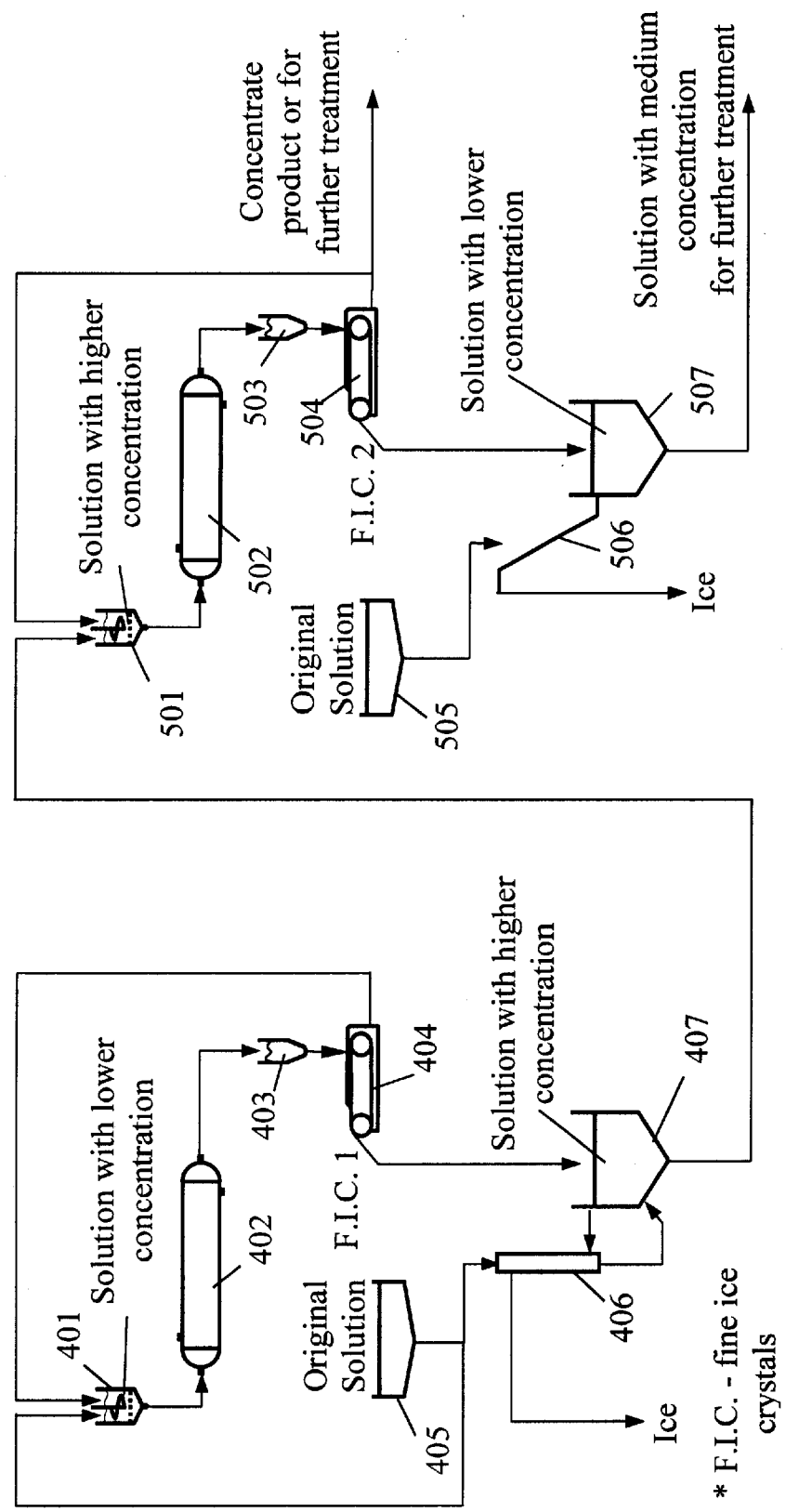
FIG. 7 is a schematic illustration for an example of an arrangement of a combination of CD-driven (concentration difference-driven) and TD-driven (temperature difference-driven) operations in a multistage freeze concentration process for aqueous solutions embodying the present invention with combined units for heat exchange, nucleation, filtration, crystal growth, transforming and agglomeration, separation of fine and large ice crystals from the mother solutions and washing.

Beside TD-related melting potential used for the process, an alternative can be made to the above-described embodiments by taking advantage of CD-related melting potential of fine ice crystals for transformation. It is more suitable for an original aqueous solution whose freezing point changes little as concentration changes or for an aqueous solution in a concentration range, in which its freezing point changes not much. An example of arrangement of freeze concentration steps by use of CD-related melting potential is shown in FIG. 6. In this case, the precooled original solution is mixed with the solution produced in the process and refrigerated to a supercooled, metastable status by a heat exchanger, and then the supercooled solution is seeded in an ice suspension for instantaneous nucleation. After separation (filtration), the solution will be recirculated back to the mixing device. Usually, the concentration of the corresponding mother solution for the generated fine ice crystals is still in the lower range. The fine ice crystals are sent to the multi-function crystallizer where, in this case, the suspension containing large growing ice crystals has a concentration much higher than that of the corresponding mother solution for fine ice crystals. Therefore, the fine ice crystals have a CD-related melting potential. According to the principles described early in this section, efficient growth, transformation and agglomeration of ice crystals can be performed in the multi-function crystallizer. Unlike TD-related process, crystallization based on CD-related melting potential needs much more heat withdraw to perform efficient growth, transformation and agglomeration of ice crystals. The mother solution in the crystallizer has higher concentration, part of which will be as product or for further concentration. The remaining mother solution will be circulated in the crystallizer. In the washing device (e.g. a column) the original, precooled solution is used and it has higher temperature than that of large ice crystals obtained from the multi-function crystallizer, so the water in solution will be frozen on the large ice crystals leading to separation of large ice crystals from concentrated solution. Actually, the arrangement of operation is also very flexible (e.g. single-stage or multiple-stage, combination of CD-related and TD-related, etc.) according to the properties of the material, characteristics of relation between freezing point and concentration of the aqueous solution and requirements of concentration. An example of arrangement of a combination of CD-related (concentration difference-related) and TD-related (temperature difference-related) operations in a multistage freeze concentration process for aqueous solutions is shown in FIG. 7.

EXAMPLE 1

This example illustrates the supercooling of aqueous solutions in a refrigerating heat exchanger without ice nucleation.

Sucrose solutions at different concentration, prepared from commercial granulate sugar and distilled water, were refrigerated in a laboratory scale tube-in-tube heat exchanger. The sucrose solutions were in the tube path and the coolant, supplied by a refrigerating bath, was in the annulus path. The operation was counter-current. The techniques described in the principle of 'supercooling, metastable solution and instantaneous nucleation' in the 'Detailed description of the invention' were applied to create higher supercooling levels. The results for the supercooling levels reached without nucleation are shown in Table 1.

TABLE 1

| solution concentration (wt %) | freezing point (° C.) | number of runs | supercooling level (° C.) | temperature difference (° C.) |
|---|---|---|---|---|
| 5 | −0.34 | 8 | 3.8–6.8 | 1.0–1.8 |
| 10 | −0.61 | 9 | 4.4–6.7 | 0.8–1.6 |
| 20 | −1.69 | 5 | 3.6–5.5 | 1.0–2.3 |
| 30 | −3.0 | 16 | 3.8–6.3 | 0.7–2.2 |
| 40 | −4.85 | 11 | 5.4–5.7 | 1.1–2.2 |

The temperature difference shown in Table 1 is that between solution and refrigerant at the solution inlet of the heat exchanger. Data show that quite high supercooling levels can be reached for sucrose solutions at different concentrations. It means that, e.g. for a 5% solution itself, 8.6% of water in the solution could be removed with a supercooling level of 6.8° C. via ice formation under adiabatic conditions. Different supercooling levels for solutions with a certain concentration can be obtained depending on the different operating conditions. The reachable supercooling levels for different concentrations are, at least, the values shown in Table 1. There is still more potential to increase the supercooling level, if the refrigeration capacity of bath and the control of operating conditions are improved.

EXAMPLE 2

This example illustrates the growth, transformation and agglomeration of ice crystals in a 1.0-liter laboratory scale multi-function crystallizer having a cooling jacket. Sucrose solutions with different concentrations were supercooled by a laboratory scale tube-in-tube heat exchanger. The supercooled solutions were nucleated and the produced fine ice crystals were separated from the concentrate by a filter. The obtained fine ice crystal slush was added into the multi-function crystallizer, where a suspension containing growing large ice crystals existed, for growth, transformation and agglomeration of ice crystals. A 5% sucrose solution as original solution was also added into the crystallizer for the process. The average results in terms of the major parameters and their standard deviations obtained from a number of runs under different conditions are shown in Table 2.

Meanings of the symbols in Table 2 are listed below:

$C_r$—concentration of the solution in refrigerating heat exchanger, i.e. concentration of the supercooled solution.

$I_f$—content of ice in the fine ice crystal slush.

$C_f$—concentration of the concentrate solution separated from the fine ice crystals.

$C_c$—concentration of the solution in the multi-function crystallizer.

$\Delta t$—average temperature difference between the fine ice crystals and bulk solution in the multi-function crystallizer.

$I_c$—ice content in the suspension (i.e. ice suspension density) in the multi-function crystallizer.

$\Delta T$—temperature difference between bulk suspension and coolant in the multi-function crystallizer.

$Y_i$—yield of ice for ice transformation and growth from the multi-function crystallizer.

$C_i$—average sucrose content in the obtained large ice crystals after washing.

TABLE 2

| concentration range | low | medium low | medium high | high |
|---|---|---|---|---|
| number of runs | 4 | 6 | 4 | 6 |
| $C_r$ (wt %) | 10.3 ± 0.3 | 20.6 ± 0.1 | 29.8 ± 0.8 | 40.4 ± 0.7 |
| $I_f$ (wt %) | 66.5 ± 3.5 | 63.6 ± 3.1 | 51.1 ± 3.0 | 45.3 ± 5.8 |
| $C_f$ (wt %) | 11.0 ± 1.3 | 22.3 ± 0.8 | 32.1 ± 0.2 | 41.5 ± 1.2 |
| $C_c$ (wt %) | 7.8 ± 0.3 | 10.8 ± 2.0 | 12.5 ± 4.2 | 17.6 ± 3.6 |
| $\Delta t$ (° C.) | ~0.3 | ~1.3 | ~2.5 | ~3.7 |
| $I_c$ (wt %) | 32.5 ± 1.2 | 29.6 ± 2.5 | 26.5 ± 7.7 | 30.6 ± 1.1 |
| $\Delta T$ (° C.) | 1.51 ± 0.05 | 1.49 ± 0.25 | 1.41 ± 0.15 | 1.41 ± 0.27 |
| $Y_i$ (kg/m³-hr) | 308.7 ± 53.6 | 397.1 ± 62.7 | 483.7 ± 56.7 | 562.9 ± 61.6 |
| $C_i$ (wt %) | 0 | 0–0.05 | 0 | 0.01–0.05 |

For all runs, average sizes of large ice crystals obtained from the transformation and agglomeration were 1 mm or larger with a standard deviation lower than 0.25 mm. The large ice crystals obtained were agglomerates with a shape of grain or sphere. The transformation and growth of ice crystals can be successfully carried out for fine ice crystals separated from concentrated solutions with different concentrations (low to high) and bulk solutions with different concentrations ($C_c$) in the crystallizer. Under stable operating conditions (concentration of bulk solution, driving forces for heat transfer ($\Delta T$) and for crystal transformation ($\Delta t$), etc.), the final yield and size distribution of ice crystals depend on the feeding rate of fine crystals with melting potentials. The yields of large ice crystals by transformation and agglomeration of ice crystals under different conditions are, at least, the $Y_i$ values shown in Table 2. There is still more potential to increase the yield of ice, if the operating conditions are automatically well-controlled.

EXAMPLE 3

This example illustrates a three-stage freeze concentration process for sucrose solutions. The operation followed the flowchart shown in FIG. 5. Data for the material balance and major operating parameters are given in Table 3 for the three freeze concentrating stages and in Table 4 for the two procedure combinations in the three-stage freeze concentration process. The material balance is on the basis of 100 kg original 5% sucrose solution to be treated.

Meanings of the symbols, in addition to those in Table 2, in Tables 3 and 4 are listed below:

$W_r$—weight of the mixed sucrose solution in the refrigerating heat exchanger.

$W_{ri}$—weight of the sucrose solution to be mixed with the recirculating solution.

$W_{rc}$—weight of the recirculating solution.

$W_{fc}$—weight of the concentrate after separation from the fine ice crystal slush.

$W_{fi}$—weight of the ice in the fine ice crystal slush after separation from the concentrate.

$W_{fl}$—weight of the entrained concentrate in the fine ice crystal slush after separation from the concentrate.

$W_o$—weight of original sucrose solution.

$W_c$—weight of preliminarily concentrated sucrose solution by the multi-function crystallizers.

$C_o$—concentration of original sucrose solution.

TABLE 3

| stage | I | II | III |
|---|---|---|---|
| material balance | | | |
| $W_r$ (kg) | 581.79 | 515.47 | 232.85 |
| $W_{ri}$ (kg) | 128.29 | 74.98 | 25.93 |
| $W_{rc}$ (kg) | 453.50 | 440.49 | 206.92 |
| $W_{fc}$ (kg) | 74.98 | 25.93 | 11.11 |
| $W_{fi}$ (kg) | 33.89 | 28.00 | 6.77 |
| $W_{fl}$ (kg) | 19.42 | 21.05 | 8.05 |
| Major parameters | | | |
| $C_r$ (wt %) | 18.81 | 28.54 | 43.35 |
| $W_{rc}:W_{ri}$ | 3.54:1 | 5.87:1 | 7.98:1 |
| supercooling (° C.) | 5.0 | 5.0 | 3.0 |
| $I_f$ (wt %) | 63.6 | 57.0 | 45.7 |
| $C_f$ (wt %) | 19.97 | 30.18 | 44.65 |

TABLE 4

| Procedure combination | 1 | 2 | total |
|---|---|---|---|
| material balance | | | |
| $W_o$ (kg) | 59.95 | 40.05 | 100.00 |
| $W_{fi}$ (kg) | 33.89 | 28.00 + 6.77* | |
| $W_{fl}$ (kg) | 19.42 | 21.05 + 8.05* | |
| $W_c$ (kg) | 68.82 | 128.29 | |
| $W_i$ (kg) | 44.45 | 44.45 | 89.90 |
| major parameters | | | |
| $C_o$ (wt %) | 5.0 | 5.0 | |
| $C_c$ (wt %) | 10.0 | 14.6 | |
| $\Delta t$ (° C.) | 1.04 | 2.04 & 4.71* | |

*the first number is for the fine ice crystal slush from stage II and the second number is for the fine ice crystal slush from stage III.

We claim:

1. A method for freeze concentration of aqueous solutions comprising the steps of:
   (a) preparing feed solution for supercooling;
   (b) supercooling said feed solution to produce supercooled, metastable solution;
   (c) generating fine ice crystals from the supercooled, metastable solution and concentrating the solution by instantaneous nucleation/crystallization;
   (d) separating fine ice crystals from mother solution to obtain wet fine ice crystals and filtrate solution;
   (e) transforming fine ice crystals having melting potential onto growing ice crystals, making growing ice crystals continue their growth and agglomerating growing ice crystals to produce large ice crystals without inside entrainment of solutes;
   (f) precooling original solution to be concentrated to prepare precooled original solution by use of large ice crystals produced in step (g); and
   (g) removing surface-entrained solution from large ice crystals to produce substantially pure large ice crystals and to recover solutes by use of the precooled original solution and water from melted ice.

2. A method according to claim 1, wherein said step (b) is for preparing supercooled, metastable solution at a substantially high supercooling level (about 3° C. to 6° C. below the freezing point of the solution) without ice formation.

3. A method according to claim 2, wherein said prepared solution is, alternatively, a supercooled solution at a substantially high supercooling level (about 3° C. to 6° C. below the freezing point of the solution) without ice formation on heat transfer surface.

4. A method according to claim 1, wherein said step (b) is performed by gradually refrigerating the aqueous solution in the initial phase to establish a substantially high supercooling level and then by maintaining the operating conditions to create a continuous, steady operation once the designed supercooling level is reached.

5. A method according to claim 1, wherein said step (c) is performed by instantaneous nucleation/crystallization as the supercooled solution at substantially high supercooling level is transported into an ice suspension, where
   i) ice crystals exists as seeds to initiate nucleation;
   ii) agitation is applied to promote efficient nucleation/crystallization; and
   iii) good insulation is used to eliminate energy loss and assure the maximum nucleation/crystallization.

6. A method according to claim 1, wherein said step (c) proceeds in a short time (less than 1 minute) and produces ice crystals smaller than 100 $\mu$m and having a disc or dendrite shape.

7. A method according to claim 1, wherein said step (d) is performed by use of continuous filtration at a temperature same as that for the ice slurry produced in said step (c).

8. A method according to claim 1, wherein said transformation of fine ice crystals onto growing ice crystals is caused by melting potential of fine ice crystals and driven by a driving force with a rate dependent on the driving force level.

9. A method according to claim 8, wherein said driving force is a temperature difference (TD) between fine ice crystals and the growing ice crystals and created by arranging solution having lower freezing point for supercooling/generating fine ice crystals and solution having higher freezing point for transformation of ice crystals, resulting in fine ice crystals having melting potential.

10. A method according to claim 1, wherein said step (a) is performed by mixing, on the basis of ice crystal transformation driven by temperature difference (TD), portion of the mother solution of ice crystals from said step (e) and portion of the filtrate solution obtained from said step (d).

11. A method according to claim 8, wherein said driving force is a concentration difference (CD) between the corresponding mother solution of fine ice crystals and the corresponding mother solution of growing ice crystals and created by arranging solution having lower concentration for supercooling/generating fine ice crystals and solution having higher concentration for transformation of ice crystals, resulting in fine ice crystals having melting potential.

12. A method according to claim 1, wherein said step (a) is performed by mixing, on the basis of ice crystal transformation driven by concentration difference (CD), portion of the precooled original solution from said step (f) and the filtrate solution obtained from said step (d).

13. A method according to claim 1, wherein said step (e) is performed by:
   i) creating and maintaining fast-growing ice crystals in solution to form a suspension, in which said step proceeds;
   ii) delivering fine ice crystals having melting potential and mixing fine ice crystals with the suspension;
   iii) establishing and maintaining a dynamic balance of heat transfer; and
   iv) controlling suitable suspension density, hence, total surface area of ice crystals in the suspension.

14. A method according to claim 13, wherein fast-growing ice crystals are created and a steady operation is maintained in the following procedures:
   i) cooling an aqueous solution with a certain concentration to its freezing point by use of a coolant having a temperature slightly below freezing point of the solution;

ii) introducing seed ice crystals with a suitable amount (kg/100 kg suspension) equal to 30d (wherein d is the average size (mm) of seed ice crystals and 30 is a factor (kg/100 kg-mm)) into the solution for growth as the temperature of the solution is about 0.1° C. below its freezing point;

iii) decreasing the coolant temperature gradually down to a suitable level (at least 1.4° C. below the freezing point of the solution) to enhance heat transfer and promote the linear growth rate of ice crystals to a high level; simultaneously, delivering wet fine ice crystals having melting potential into the suspension gradually and increasingly for transformation of fine ice crystals onto fast-growing ice crystals and agglomeration of growing ice crystals due to high phase transition rate; simultaneously, controlling the ice suspension density (kg/100 kg suspension) around a value equal to 30d (wherein d is the average size (mm) of ice crystals and 30 is a factor (kg/100 kg-mm)) by adjusting the removing rate of large ice crystals and the feeding rate of wet fine ice crystals; and iv) maintaining the operating conditions created to continue the process steadily, when an optimal high rate of ice crystal transformation and agglomeration is reached.

15. A method according to claim 1, wherein said steps (a) through (d) form a unit combination and said steps (e) through (g) form another unit combination and they are run in a manner by arranging equal numbers of (a) through (d) combination and (e) through (g) combination together to establish a stage-wise operation with solutions transferable from one stage to another and ice crystals in step (e) non-transferable from one stage to another.

16. A method according to claim 1, wherein said steps (a) through (d) form a unit combination and said steps (e) through (g) form another unit combination and they are run in a manner by arranging different numbers of (a) through (d) combination and (e) through (g) combination together to establish a stage-wise operation with solutions transferable from one stage to another and ice crystals in step (e) non-transferable from one stage to another.

17. A system for freeze concentration of aqueous solutions comprising:

(a) a mixing tank equipped with an agitator and good insulation for preparing a feed solution for supercooling;

(b) a conventional shell and tube heat exchanger with the feed solution in the tube side and the coolant in the shell side in a counter-current manner for supercooling the feed solution to produce a supercooled, metastable solution;

(c) a nucleator having an agitator and good insulation for generating fine ice crystals from the supercooled, metastable solution and concentrating the solution by instantaneous nucleation/crystallization;

(d) a continuous filter for separating fine ice crystals from the concentrated solution produced by the nucleator to obtain wet fine ice crystals and filtrate solution;

(e) a multi-function crystallizer for transforming fine ice crystals onto growing ice crystals, making growing ice crystals continue their growth and agglomerating growing ice crystals to obtain large ice crystals;

(f) heat transfer means for precooling original solution to prepare precooled original solution by use of large ice crystals; and (g) separating/washing means for removing surface-entrained solution from large ice crystals by use of the precooled original solution and water from melted ice to obtain substantially pure ice crystals.

18. A system according to claim 17, wherein said feed solution is prepared in said mixing tank by, for a temperature difference (TD) driven operation, mixing said mother solution delivered from said multi-function crystallizer and portion of said filtrate solution delivered from said continuous filter.

19. A system according to claim 17, wherein said feed solution is prepared in said mixing tank by, for a concentration difference (CD) driven operation, mixing portion of the precooled original solution delivered from said heat transfer means and the filtrate solution delivered from said continuous filter.

20. A system according to claim 17, wherein said multi-function crystallizer is an assembly of components including:

a round-bottom vessel;

heat transfer means for withdrawing heat by use of refrigerating coolant;

means for mixing feeds and stirring the ice suspension;

an inlet for receiving wet fine ice crystals having melting potential and making them to meet growing ice crystals suspended in the vessel;

an screen at the top outlet of the vessel for separating large ice crystals from the suspension liquid containing small ice crystals;

pump means for recirculating suspension liquid from the top outlet screen to the vessel;

a segregating screen at the bottom outlet of the vessel for segregating suspension and the mother solution of ice crystals in the vessel.

21. A system according to claim 20, wherein said heat transfer means for withdrawing heat is a jacket outside the vessel.

22. A system according to claim 20, wherein said heat transfer means for withdrawing heat is an annular shell and tube heat exchanger inside the vessel with suspension in the tube side and the coolant in the shell side.

23. A system according to claim 20, wherein said means for mixing feeds and stirring the ice suspension is a central agitator in the vessel.

24. A system according to claim 20, wherein said means for mixing feeds and stirring the ice suspension is a central circulating propeller in the vessel.

* * * * *